United States Patent
Richman

(10) Patent No.: US 7,116,418 B2
(45) Date of Patent: *Oct. 3, 2006

(54) SPECTRAL IMAGING APPARATUS AND METHODS

(75) Inventor: Isaac Richman, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 122 days.

This patent is subject to a terminal disclaimer.

(21) Appl. No.: 10/945,404

(22) Filed: Sep. 20, 2004

(65) Prior Publication Data

US 2005/0036141 A1   Feb. 17, 2005

Related U.S. Application Data

(63) Continuation-in-part of application No. 10/289,633, filed on Nov. 7, 2002, now Pat. No. 6,813,018.

(51) Int. Cl.
    *G01J 3/18* (2006.01)
(52) U.S. Cl. ........................... 356/328; 356/305
(58) Field of Classification Search ............... 356/305, 356/326, 328, 334
    See application file for complete search history.

(56) References Cited

U.S. PATENT DOCUMENTS

| | | | | |
|---|---|---|---|---|
| 2,995,973 A | * | 8/1961 | Bowling et al. | ............ 356/331 |
| 3,567,322 A | * | 3/1971 | Brehm et al. | ............... 356/332 |
| 3,753,618 A | * | 8/1973 | Haley | ......................... 356/334 |
| 5,305,082 A | | 4/1994 | Bret | |
| 5,880,834 A | | 3/1999 | Chrisp | |
| 6,813,018 B1 | * | 11/2004 | Richman | ..................... 356/328 |
| 6,839,136 B1 | * | 1/2005 | Mikes | ......................... 356/328 |

* cited by examiner

*Primary Examiner*—F. L. Evans
(74) *Attorney, Agent, or Firm*—Lee & Hayes, PLLC

(57) ABSTRACT

Spectral imaging apparatus and methods are disclosed. In one embodiment, a spectral imaging apparatus includes a spectral imaging apparatus includes a diffraction grating having one or more entrance apertures formed therein, a collecting reflecting element for reflecting said incident radiation to a diffractive surface of said diffraction grating, and a reimaging system adapted to provide a spectral image at a focal surface. The collecting reflecting element may include an aspherically-shaped portion, and the entrance apertures may be distributed along a straight or a non-straight axis. Alternately, optical fibers may be disposed in the entrance apertures. The spectral image provides a spectrum of radiation such that a first portion of the spectrum of radiation from a first region can be distinguished from a second portion of the spectrum of radiation from a second region.

54 Claims, 4 Drawing Sheets

SPECTRAL IMAGING APPARATUS AND METHODS

CROSS REFERENCE TO RELATED APPLICATIONS

This patent application is a continuation-in-part of, commonly-owned U.S. patent application Ser. No. 10/289,633 entitled "SPECTRAL IMAGER", filed on Nov. 7, 2002 now U.S. Pat. No. 6,813,018, which application is incorporated herein by reference.

FIELD OF THE INVENTION

The present invention relates to spectral imaging apparatus and methods, and more specifically, to spectral imaging apparatus having a collecting reflecting element that includes an aspherically-shaped portion, and a diffraction grating having a single or plurality of entrance apertures formed therein.

BACKGROUND OF THE INVENTION

Spectral imagers, including spectral imagers and the like, are becoming an important tool in remote sensing for military and commercial applications. A simple, robust, high quality imager suitable for virtually any visible and infrared region does not currently exist. There are also applications where spectra of individual and physically displaced samples are required. These applications may include, for example, obtaining simultaneous absorption or fluorescence spectra of large numbers of biological or pharmaceutical samples, as well as the emission spectra of large numbers of stars.

Three typical problems that arise in designing an imaging spectrometer where light passing through an entrance slit is to be diffracted by a grating parallel to the slit are: (1) reducing or eliminating astigmatism over the spectrum on the image plane; (2) removing field curvature from the spectrum focused onto the image plane; and (3) obtaining good spatial resolution of the entrance slit, including reducing or eliminating astigmatism at different field angles from points on the entrance slit.

Although desirable results have been achieved using prior art apparatus and methods, there is room for improvement. For example, prior art devices may be mechanically sensitive, and may have a reduced capacity to obtain spectra from various physically separated spatial regions. Therefore, novel apparatus and methods that at least partially mitigate these effects would be useful.

SUMMARY OF THE INVENTION

The present invention is directed to spectral imaging apparatus and methods. Spectral imaging apparatus in accordance with the present invention may advantageously be used in substantially any optical regime amenable to spectral dispersion by a grating, may be mechanically robust, may be suitable for operation at cryogenic temperatures, may provide improved performance, and may provide an improved capacity to obtain spectra from various physically separated spatial regions.

In one embodiment, a spectral imaging apparatus includes a diffraction grating having an entrance slit formed therein, a collecting reflecting element for receiving said incident radiation transmitted through said entrance slit and reflecting said incident radiation to a diffractive surface of said diffraction grating, and a reimaging system adapted to receive radiation diffracted by said diffractive surface and to provide a spectral image at a focal surface, wherein said spectral image being further adapted to provide a spectrum of radiation from the incident radiation propagating through said entrance slit such that a first portion of the spectrum of radiation from a first region in the y-direction can be distinguished from a second portion of the spectrum of radiation from a second region in the y-direction.

In another embodiment, a spectral imaging apparatus includes a diffraction grating having a plurality of entrance apertures formed therein and adapted to transmit an incident radiation therethrough, a collecting reflecting element for receiving said incident radiation transmitted through said entrance apertures and reflecting said incident radiation to a diffractive surface of said diffraction grating, a plurality of grooves on said diffractive surface being substantially parallel to said y-direction; and a reimaging system adapted to receive radiation diffracted by said diffractive surface and to provide a spectral image at a focal surface, wherein said spectral image being further adapted to provide a spectrum of radiation from the incident radiation propagating through said entrance apertures such that a first portion of the spectrum of radiation from a first region in the y-direction can be distinguished from a second portion of the spectrum of radiation from a second region in the y-direction. The plurality of entrance apertures are distributed along an axis having a long dimension oriented in a y-direction. In alternate embodiments, the axis may be a straight or a non-straight axis. In further embodiments, optical fibres may be disposed in the entrance apertures.

BRIEF DESCRIPTION OF THE DRAWINGS

Preferred and alternative embodiments of the present invention are described in detail below with reference to the following drawings;

FIG. 1b is a slit end view of the spectral imager of FIG. 1a;

DETAILED DESCRIPTION

The present invention relates to spectral imaging apparatus and methods. Many specific details of certain embodiments of the invention are set forth in the following description and in FIGS. 1–6 to provide a thorough understanding of such embodiments. One skilled in the art will understand, however, that the present invention may have additional embodiments, and that the present invention may be practiced without several of the details described in the following description.

Figure 1A:
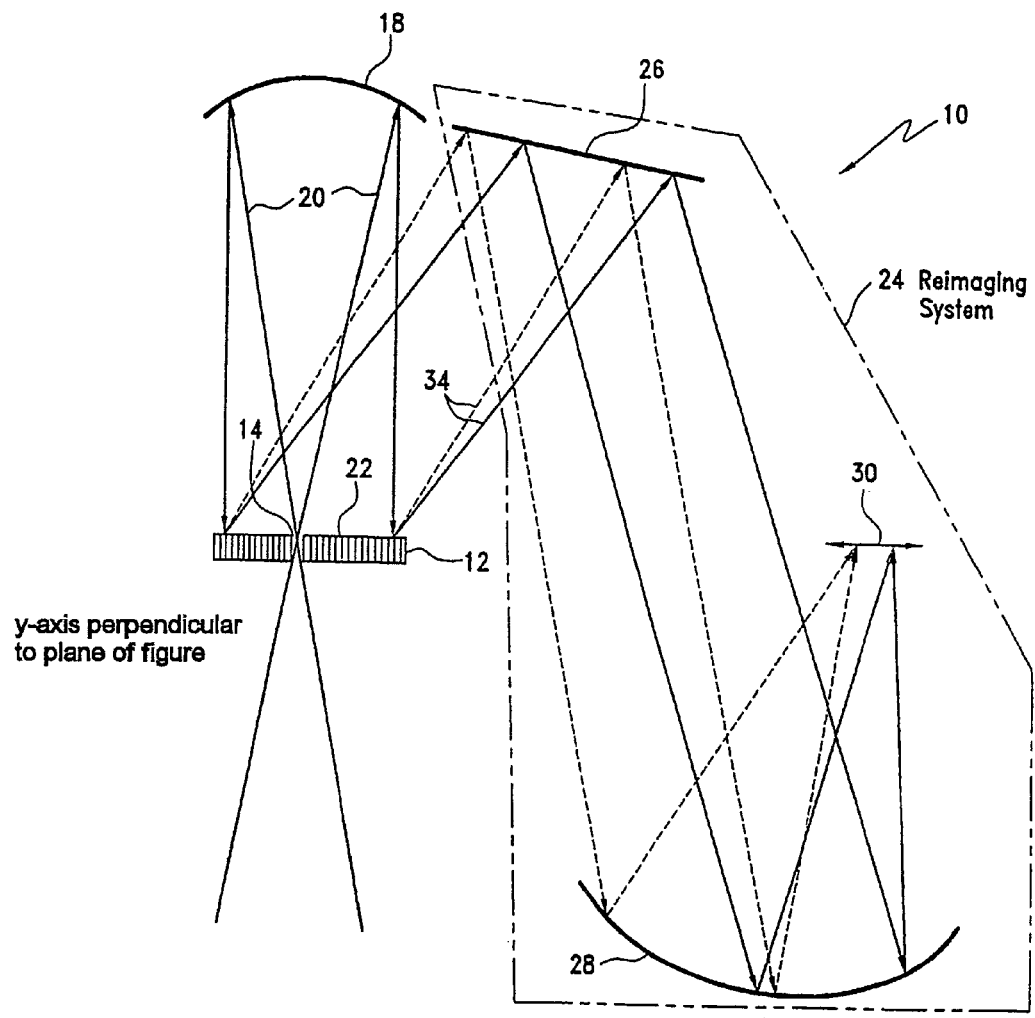
FIG. 1a is a plan view schematic illustration of a spectral imager in accordance with an embodiment of the present invention.
Figure 1B:
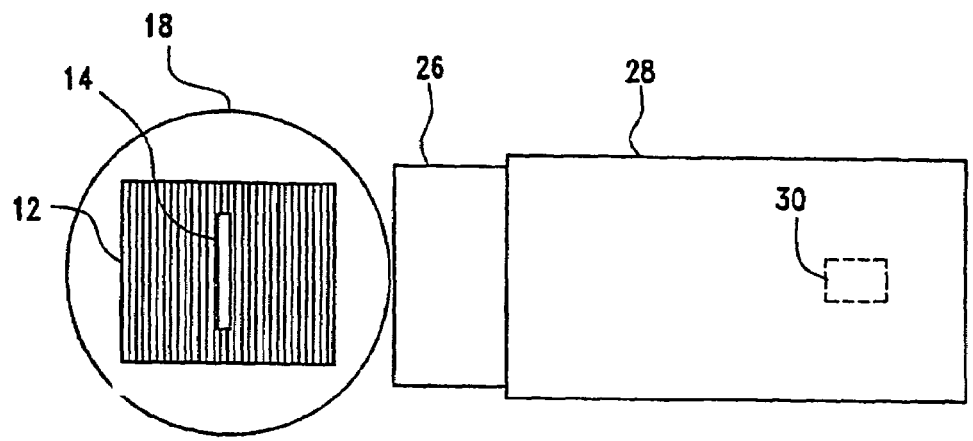

Referring now to the drawings and the characters of reference marked thereon, FIGS. 1a and 1b provide a schematic illustration of the spectral imager of the present invention, designated generally as 10. The spectral imager 10 includes a diffraction grating 12 having an entrance slit 14 formed at an entrance slit location therein. The entrance slit 14 has a long dimension oriented in a y-direction, perpendicular to the plane of FIG. 1a. The entrance slit 14 transmits the radiation from a slice of an incoming scene image. The diffraction grating 12 may be a reflection diffraction grating, as shown in the figure or alternatively, it may be a transmitting diffraction grating. Furthermore, the diffraction grating may be substantially planar, as shown, or may have a concave or convex surface or combinations thereof. Although the base diffraction grating may be commercially available, from, for example, Hyperfine or Carl Zeiss Produkt Bereich, the entrance slit 14 is specially fabricated. There may be a variety of ways for fabricating the slit 14 including, for example, electric discharge machining (EDM), chemical etching, or mechanical milling. It will be appreciated that the spectral imager 10 may use any desired type of spectral imaging technique, including, for example, hyperspectral imaging, multispectral imaging, or any other suitable type of spectral imaging.

The slit location is preferably formed at a substantially central location of the diffraction grating 12. Use of a central location for the slit 14 enables substantially on-axis collection of radiation transmitted through the slit 14. The slit may have a substantially rectangular shape as shown in FIG. 1. Alternatively, it may have a curved shape. Furthermore, it may lie on a substantially planar surface, as shown, or lie on a curved surface. Deviation of the shape of the slit 14 from rectangular and on a planar surface may be performed to optimize the spectral image on the focal surface. For example, if the monochromatic slit image at the spectrograph focal surface is curved, resulting in what is commonly referred to as "smile," this may be partly corrected by curving the entrance slit appropriately. The spectrograph optics may then be designed to compensate for slit plane curvature and other aberrations to provide a plane focal surface for the detector array.

A collecting reflecting element 18 receives the transmitted radiation 20 of the incoming scene image and reflects the transmitted radiation 20 to a diffractive surface 22 of the diffraction grating 12. Grooves on the diffractive surface 22 are substantially parallel to the y-direction. Substantial deviation from the y-direction would cause undesired spectral artifacts. As used herein, the term "groove" refers to physical rulings, etched grooves, or for some holographic gratings, regions of constant phase shift, or any other structure serving a similar diffracting function.

The collecting reflecting element 18 may have at least a portion that is an aspherically-shaped (or generally aspheric shape) reflecting surface. In one particular embodiment, for example, the collecting reflecting element 18 may have a paraboloidal shape. However, the collecting reflecting element 18 may alternatively have a surface curvature other than an aspherically-shaped reflecting surface, including planar. Furthermore, the collecting reflecting element 18 may incorporate refractive components for improving image quality.

A reimaging system 24 receives radiation diffracted by the diffractive surface 22. Radiation diffracted from the diffractive surface 22 is reflected from a first reimaging reflecting element 26 and from a second reimaging reflecting element 28. The reimaging system 24 produces a spectral image of the entrance slit 14. The reimaging system 24 may comprise a set of reflective or refractive, relayed or non-relayed elements or a combination thereof. In one embodiment, the reimaging system 24 is a three mirror anastigmat (TMA), as will be shown below with reference to FIGS. 3–4. In alternate embodiments, reimaging systems other than a three mirror anastigmat may be utilized. For example, in one embodiment the radiation diffracted from the grating is collimated. Any optical system designed to image collimated radiation (e.g., refractive, reflective, or catadioptric camera lenses) may be used for the reimaging system 24.

The reimaging system 24 focuses the spectral image of the slit at a focal surface 30. The focal surface 30 may be flat or curved depending on the desired application. If the detection medium is a planar detector array, the focal surface is designed to be sufficiently flat that it matches the array. If the detection medium is film or other medium that can be formed to a nonplanar shape, the optical configuration may be simplified because the requirement for a flat focal surface is relaxed.

The spectral image advantageously provides a spectrum of radiation propagating through the entrance slit 14 into the spectral imager 10 such that the spectrum of radiation from a first region in the y-direction can be distinguished from the spectrum of radiation from other regions in the y-direction.

Figure 2:
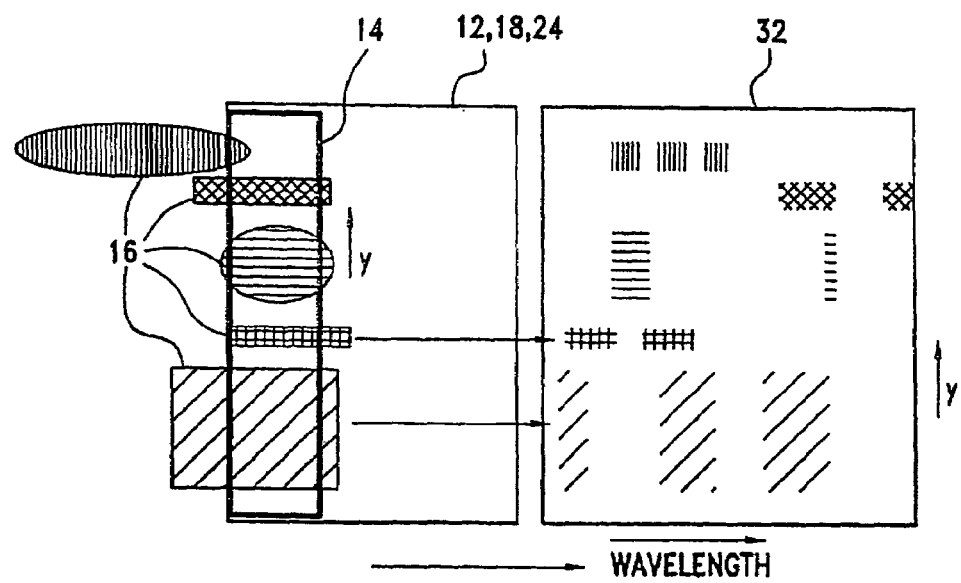
FIG. 2 is a schematic illustration of the generation of spectra from objects in a scene utilizing a spectral imager in accordance with an embodiment of the present invention.

Referring now to FIGS. 1a, 1b, and 2, the relation between the slit 14 and the resulting spectral image 32 of the slit 14 is illustrated. The entrance slit 14 transmits the radiation from a slice of the incoming scene image 16 to the collecting reflecting element 18, whence it propagates to the grating 12. The collecting reflecting element 18 collimates or otherwise alters the angular content of the radiation. The grating 12 diffracts the radiation. The diffracted radiation 34 propagates to the reimaging system 24. The reimaging system 24 focuses the radiation onto the focal surface 30. A detecting medium 36 is positioned at or near the focal surface 30, and detects the radiation contained in the spectrally dispersed image of the slit. The detecting medium 36 may be, for example, photographic film, a detector array or other suitable radiation detectors.

Figure 3:
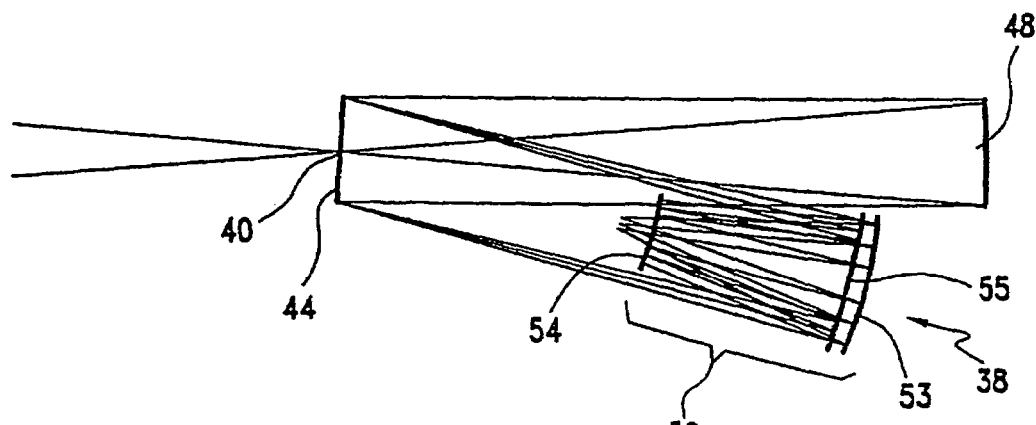
FIG. 3 is plan view of a spectral imaging apparatus in accordance with another embodiment of the present invention.
Figure 4:
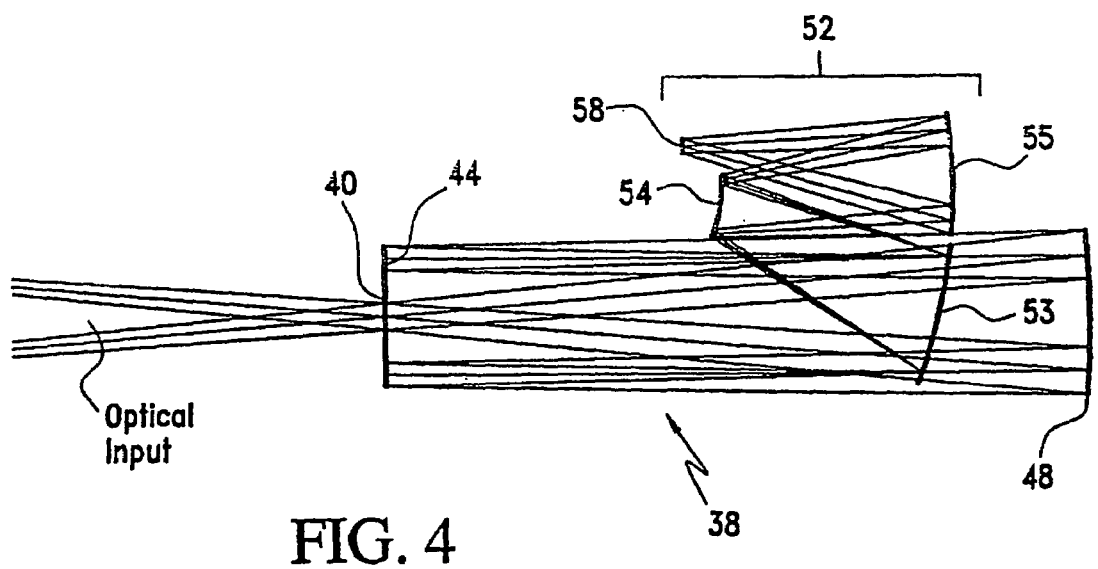
FIG. 4 is a side view of the spectral imaging apparatus of FIG. 3.

FIGS. 3 and 4 illustrate another embodiment of the invention. In this embodiment, a spectral imaging apparatus 38 comprises a plane rectangular entrance slit 40, a diffraction grating 44, followed by a paraboloidal collimating mirror 48, followed by a three-mirror anastigmat 52 that produces the spectrally dispersed image of the entrance slit on the focal surface 58. The three-mirror anastigmat comprises mirrors 53, 54, and 55. The direction of diffraction spreading radiation, termed the "spectral" direction, is perpendicular to the slit long dimension. The long dimension of the entrance slit, termed the "spatial" direction, is parallel to the y-direction, as shown in the previous figures. The entrance slit 40 is centered on the diffractive surface of the grating 44. The axis of the paraboloidal mirror 48 passes through the slit center, and is in the plane of the perpendicular bisector of the entrance slit 40. Thus, the optics operate on-axis in the spectral direction, and closely so in the spatial direction. The front-end collecting optics (not shown) image the scene onto the slit plane. With appropriate choice of optical parameters the entrance aperture of the front-end collecting optics may be reimaged at the grating surface, making that surface an ideal location for a baffle or cold stop. The three-mirror anastigmat 52 receives substantially collimated radiation from the surface of the diffraction grating 44, and produces at the focal surface 58 a spectrally-dispersed image of the entrance slit 40.

Applications of the present invention include the monitoring of farm crop health and water demand, monitoring for hazardous gases, identifying pollutant gases, oceanographic applications, monitoring of pollution in river waters, as well as various defense applications such as detecting camouflage.

Figure 5:
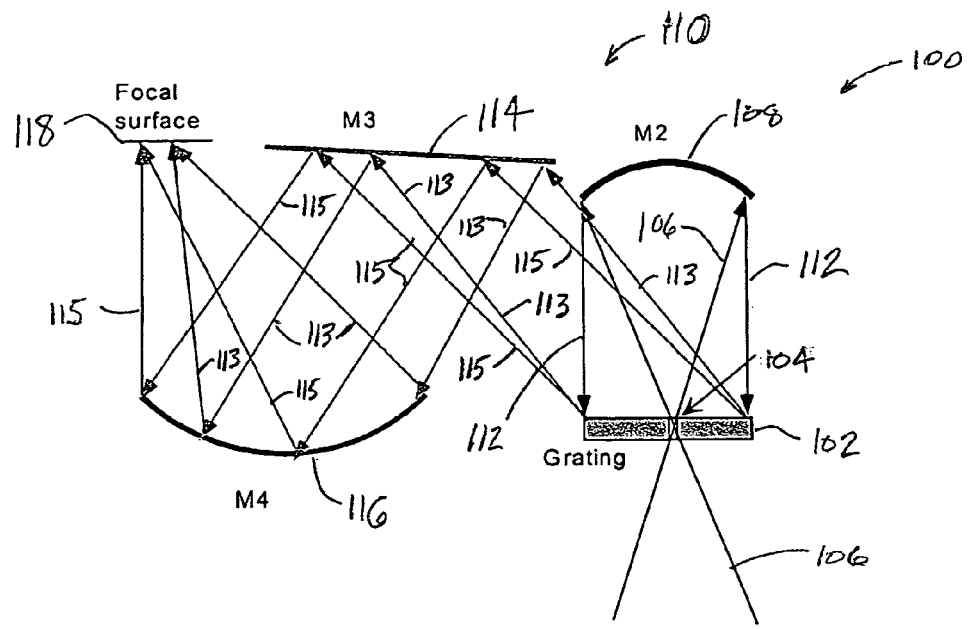
FIG. 5 is a plan view schematic illustration of a spectral imaging apparatus in accordance with yet another embodiment of the invention.

FIG. 5 is a plan view schematic illustration of a spectral imaging apparatus 100 in accordance with yet another embodiment of the invention. In this embodiment, the spectral imaging apparatus 100 includes a diffraction grating 102 having a plurality of apertures (or ports) 104 disposed therethrough. The diffraction grating 102 may be approximately planar or, in alternate embodiments, may be any desired shape or surface perturbation necessary or desirable to improve or optimize the apparatus 100. The diffraction grating 102 may be blazed or of other configuration. If it is a laminar or sinusoidal grating, a second reimaging system may be positioned to the right of the diffraction grating 102. The second reimaging system (not shown) may be similar in design to the reimaging system 110 shown on the left side of the diffraction grating 102 in FIG. 5, such as a reverse-oriented or mirror-image reimaging system.

Figure 6:
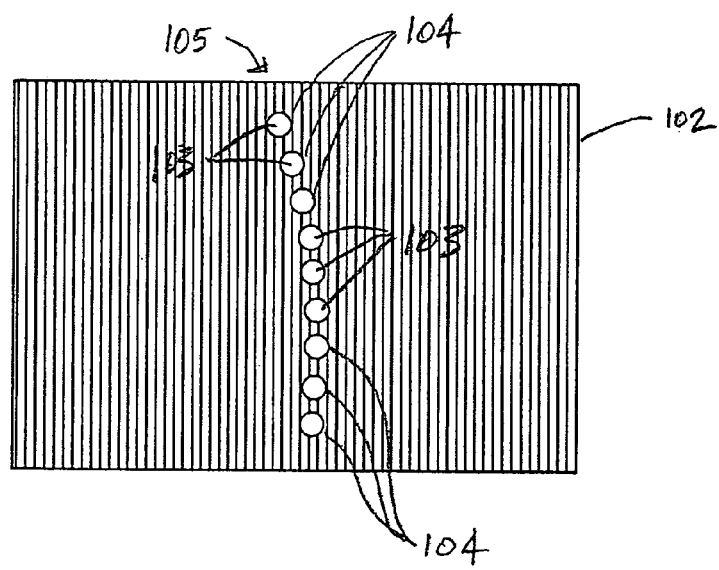
FIG. 6 is a side elevational view of a diffraction grating of the spectral imaging apparatus of FIG. 5.

FIG. 6 is a side elevational view of the diffraction grating 102 of FIG. 5. Each of the apertures 104 may contain a fibre end or a tape containing the ends of individual fibres. Incident radiation 106 passes through the plurality of apertures 104 of the diffraction grating 102. In FIG. 5, the diffraction grating 102 is shown normal to the cone of incident radiation 106, however, in alternate embodiments, it could be tipped. After passing through the plurality of apertures 104, the incident radiation 106 impinges upon a first mirror 108 of a reimaging system 110. In one embodiment, the first mirror 108 may be a paraboloidal mirror, but in alternate embodiments, it may include any desired shape or surface perturbation necessary or desirable to improve or optimize the apparatus 100. The reflected radiation 112 may be collimated by the first mirror 108.

From the first mirror 108, reflected radiation 112 is directed back to the diffraction grating 102, from which it is reflected toward a second mirror 114. The reflected radiation 112 may be refracted into first and second portions 113, 115 by the diffraction grating 102. From the second mirror 114, the first and second portions 113, 115 of the reflected radiation 112 are directed toward a third mirror 116 of the reimaging system 110, and then toward a focal surface 118.

Referring again to FIG. 6, in this embodiment, the plurality of apertures 104 are adapted to receive individual fibres 103 and are disposed along an approximately central portion 105 of the diffraction grating 102. The apertures 104 may be oriented in a straight line or, as shown in FIG. 6, along a curved or non-straight line to reduce distortion in the resultant spectral image at the focal surface 118. The apertures 104 may be formed using any suitable manufacturing method as may be appropriate for the material of the diffraction grating 102 (e.g. glass or metal), including mechanical drilling, successive photolithography and etching, laser machining, electric discharge machining (EDM), or any other appropriate manufacturing method. The fibres 103 may be inserted into the apertures 104 so that the exit faces lie on a predetermined surface (e.g. plane at the grating surface, toroid, sphere, etc.).

Apparatus and methods in accordance with the present invention may provide advantages over the prior art. For example, spectral imaging apparatus in accordance with the present invention may be used in substantially any optical regime amenable to spectral dispersion by a grating. The spectral imaging apparatus disclosed herein are mechanically robust and are generally suitable for operation at cryogenic temperatures. Furthermore, the spectral imaging apparatus in accordance with the present invention may provide improved performance, and may provide an improved capacity to obtain spectra from various physically separated spatial regions.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A spectral imaging apparatus, comprising:
   a diffraction grating having an entrance slit formed therein, said entrance slit having a long dimension oriented in a y-direction, said entrance slit being adapted to transmit an incident radiation therethrough;
   a collecting reflecting element for receiving said incident radiation transmitted through said entrance slit and reflecting said incident radiation to a diffractive surface of said diffraction grating, a plurality of grooves on said diffractive surface being substantially parallel to said y-direction, said collecting reflecting element including an aspherically-shaped portion; and
   a reimaging system adapted to receive radiation diffracted by said diffractive surface and to provide a spectral image at a focal surface, wherein said spectral image being further adapted to provide a spectrum of radiation from the incident radiation propagating through said entrance slit such that a first portion of the spectrum of radiation from a first region in the y-direction can be distinguished from a second portion of the spectrum of radiation from a second region in the y-direction.

2. The spectral imaging apparatus of claim 1, wherein said entrance slit is formed at a substantially central location of said diffraction grating.

3. The spectral imaging apparatus of claim 1, wherein said slit comprises at least one of a substantially rectangular shape and a curved shape.

4. The spectral imaging apparatus of claim 1, wherein said slit is formed in at least one of a substantially planar surface and a curved surface.

5. The spectral imaging apparatus of claim 1, wherein said diffraction grating comprises at least one of a reflection diffraction grating and a transmitting diffraction grating.

6. The spectral imaging apparatus of claim 1, wherein said diffraction grating includes at least one of a substantially planar surface, a concave surface, and a convex surface.

7. The spectral imaging apparatus of claim 1, wherein said collecting reflecting element comprises a substantially planar surface.

8. The spectral imaging apparatus of claim 1, wherein said aspherically-shaped portion of the collecting reflecting element comprises a reflecting curved surface.

9. The spectral imaging apparatus of claim 1, wherein said aspherically-shaped portion of the collecting reflecting element comprises a reflecting curved surface having a paraboloidal shape.

10. The spectral imaging apparatus of claim 1, wherein said collecting reflecting element includes a refractive component.

11. The spectral imaging apparatus of claim 1, wherein said reimaging system comprises at least one of a reflective reimaging element and a refractive reimaging element.

12. The spectral imaging apparatus of claim 1, wherein said reimaging system comprises a three mirror anastigmat.

13. The spectral imaging apparatus of claim 1, wherein said focal surface includes at least one of a substantially planar portion and a curved portion.

14. A spectral imaging apparatus, comprising:
a diffraction grating having a plurality of entrance apertures formed therein, said entrance apertures being distributed along an axis having a long dimension oriented in a y-direction, said entrance apertures being adapted to transmit an incident radiation therethrough;
a collecting reflecting element for receiving said incident radiation transmitted through said entrance apertures and reflecting said incident radiation to a diffractive surface of said diffraction grating, a plurality of grooves on said diffractive surface being substantially parallel to said y-direction; and
a reimaging system adapted to receive radiation diffracted by said diffractive surface and to provide a spectral image at a focal surface, wherein said spectral image being further adapted to provide a spectrum of radiation from the incident radiation propagating through said entrance apertures such that a first portion of the spectrum of radiation from a first region in the y-direction can be distinguished from a second portion of the spectrum of radiation from a second region in the y-direction.

15. The spectral imaging apparatus of claim 14, wherein said entrance apertures are formed at a substantially central location of said diffraction grating.

16. The spectral imaging apparatus of claim 14, wherein said axis along which said entrance apertures are formed comprises a non-straight axis.

17. The spectral imaging apparatus of claim 14, wherein said entrance apertures are formed in at least one of a substantially planar surface and a curved surface of the diffraction grating.

18. The spectral imaging apparatus of claim 14, wherein said plurality of entrance apertures includes a plurality of circular ports.

19. The spectral imaging apparatus of claim 14, wherein said plurality of entrance apertures are adapted to receive an optical fibre.

20. The spectral imaging apparatus of claim 14, further comprising a plurality of optical fibres, each fibre being disposed in a corresponding one of the entrance apertures.

21. The spectral imaging apparatus of claim 20 wherein the plurality of optical fibres are inserted into the corresponding entrance apertures so that an exit face of each optical fibre is substantially co-planar.

22. The spectral imaging apparatus of claim 20 wherein the plurality of optical fibres are inserted into the corresponding entrance apertures so that an exit face of each optical fibre is substantially co-planar with at a predetermined surface, the predetermined surface comprising at least one of a planar surface, a toroidal surface, and a spherically-shaped surface.

23. The spectral imaging apparatus of claim 14, wherein said diffraction grating comprises at least one of a reflection diffraction grating and a transmitting diffraction grating.

24. The spectral imaging apparatus of claim 14, wherein said diffraction grating includes at least one of a substantially planar surface, a concave surface, and a convex surface.

25. The spectral imaging apparatus of claim 14, wherein said collecting reflecting element includes an aspherically-shaped portion.

26. The spectral imaging apparatus of claim 25, wherein said aspherically-shaped portion of the collecting reflecting element comprises a reflecting curved surface.

27. The spectral imaging apparatus of claim 25, wherein said aspherically-shaped portion of the collecting reflecting element comprises a reflecting curved surface having a paraboloidal shape.

28. The spectral imaging apparatus of claim 14, wherein said collecting reflecting element includes a refractive component.

29. The spectral imaging apparatus of claim 14, wherein said reimaging system comprises at least one of a reflective reimaging element and a refractive reimaging element.

30. The spectral imaging apparatus of claim 14, wherein said reimaging system comprises a three mirror anastigmat.

31. The spectral imaging apparatus of claim 14, wherein said focal surface includes at least one of a substantially planar portion and a curved portion.

32. A method for spectral imaging, comprising:
transmitting incident radiation through an entrance slit formed in a diffraction grating, said entrance slit having a long dimension oriented in a y-direction;
receiving said transmitted radiation via a collecting reflecting element including an aspherically-shaped portion and reflecting said transmitted radiation to a diffractive surface of said diffraction grating, grooves on said diffractive surface being substantially parallel to said y-direction; and
receiving radiation diffracted by said diffractive surface and producing a spectral image of said incident radiation transmitted through said entrance slit at a focal surface, wherein said spectral image provides a spectrum of radiation propagating through said entrance slit such that a first portion of the spectrum of radiation from a first region in the y-direction can be distinguished from a second portion of the spectrum of radiation from a second region in the y-direction.

33. The method of claim 32, wherein transmitting incident radiation through an entrance slit includes transmitting incident radiation through an entrance slit formed at a substantially central location of said diffraction grating.

34. The method of claim 32, wherein transmitting incident radiation through an entrance slit includes transmitting incident radiation through an entrance slit comprising at least one of a substantially rectangular shape and a curved shape.

35. The method of claim 32, wherein transmitting incident radiation through an entrance slit includes transmitting incident radiation through an entrance slit formed in at least one of a substantially planar surface and a curved surface.

36. The method of claim 32, wherein transmitting incident radiation through an entrance slit includes transmitting incident radiation through an entrance slit formed in a diffraction grating having at least one of a reflection diffraction grating portion and a transmitting diffraction grating portion.

37. The method of claim 32, wherein receiving said transmitted radiation via a collecting reflecting element including an aspherically-shaped portion comprises receiving said transmitted radiation via a collecting reflecting element including a reflecting curved surface.

38. The method of claim 32, wherein receiving said transmitted radiation via a collecting reflecting element including an aspherically-shaped portion comprises receiving said transmitted radiation via a collecting reflecting element including a reflecting curved surface having a paraboloidal shape.

39. The method of claim 32, wherein receiving said transmitted radiation via a collecting reflecting element comprises receiving said transmitted radiation via a collecting reflecting element including a refractive component.

40. The method of claim 32, wherein receiving radiation diffracted by said diffractive surface and producing a spectral image of said incident radiation includes receiving radiation diffracted by said diffractive surface and producing a spectral image of said incident radiation using a reimaging system having at least one of a reflective reimaging element and a refractive reimaging element.

41. The method of claim 32, wherein receiving radiation diffracted by said diffractive surface and producing a spectral image of said incident radiation includes receiving radiation diffracted by said diffractive surface and producing a spectral image of said incident radiation using a three mirror anastigmat.

42. A method for spectral imaging, comprising:
transmitting incident radiation through a plurality of entrance apertures formed in a diffraction grating and distributed along an axis having a long dimension oriented in a y-direction;
receiving said transmitted radiation via a collecting reflecting element and reflecting said transmitted radiation to a diffractive surface of said diffraction grating, grooves on said diffractive surface being substantially parallel to said y-direction; and
receiving radiation diffracted by said diffractive surface and producing a spectral image of said incident radiation transmitted through said entrance apertures at a focal surface, wherein said spectral image provides a spectrum of radiation propagating through said entrance apertures such that a first portion of the spectrum of radiation from a first region in the y-direction can be distinguished from a second portion of the spectrum of radiation from a second region in the y-direction.

43. The method of claim 42, wherein transmitting incident radiation through said entrance apertures includes transmitting incident radiation through said entrance apertures distributed along a non-straight axis.

44. The method of claim 42, wherein transmitting incident radiation through said entrance apertures includes transmitting incident radiation through a plurality of circular ports.

45. The method of claim 42, wherein at least some of the plurality of entrance apertures include an optical fibre, and wherein transmitting incident radiation through said entrance apertures includes transmitting incident radiation through said optical fibres.

46. The method of claim 45 wherein the optical fibres are inserted into the corresponding entrance apertures so that an exit face of each optical fibre is substantially co-planar.

47. The method of claim 45 wherein the optical fibres are inserted into the corresponding entrance apertures so that an exit face of each optical fibre is substantially co-planar with at a predetermined surface, the predetermined surface comprising at least one of a planar surface, a toroidal surface, and a spherically-shaped surface.

48. The method of claim 42, wherein transmitting incident radiation through said entrance apertures includes transmitting incident radiation through said entrance apertures formed in at least one of a substantially planar surface and a curved surface.

49. The method of claim 42, wherein transmitting incident radiation through said entrance apertures includes transmitting incident radiation through said entrance apertures formed in a diffraction grating having at least one of a reflection diffraction grating portion and a transmitting diffraction grating portion.

50. The method of claim 42, wherein receiving said transmitted radiation via a collecting reflecting element comprises receiving said transmitted radiation via a collecting reflecting element including an aspherically-shaped portion.

51. The method of claim 42, wherein receiving said transmitted radiation via a collecting reflecting element including an aspherically-shaped portion comprises receiving said transmitted radiation via a collecting reflecting element including a reflecting curved surface having a paraboloidal shape.

52. The method of claim 42, wherein receiving said transmitted radiation via a collecting reflecting element comprises receiving said transmitted radiation via a collecting reflecting element including a refractive component.

53. The method of claim 42, wherein receiving radiation diffracted by said diffractive surface and producing a spectral image of said incident radiation includes receiving radiation diffracted by said diffractive surface and producing a spectral image of said incident radiation using a reimaging system having at least one of a reflective reimaging element and a refractive reimaging element.

54. The method of claim 42, wherein receiving radiation diffracted by said diffractive surface and producing a spectral image of said incident radiation includes receiving radiation diffracted by said diffractive surface and producing a spectral image of said incident radiation using a three mirror anastigmat.

* * * * *